United States Patent
Colosimo

(10) Patent No.: US 7,543,451 B2
(45) Date of Patent: Jun. 9, 2009

(54) AIRCRAFT ENGINE EXHAUST SHROUD

(75) Inventor: Nicholas G. R. Colosimo, Preston (GB)

(73) Assignee: BAE Systems PLC, London (GB)

( * ) Notice: Subject to any disclaimer, the term of this patent is extended or adjusted under 35 U.S.C. 154(b) by 1199 days.

(21) Appl. No.: 10/265,097

(22) Filed: Sep. 25, 2002

(65) Prior Publication Data

US 2008/0210778 A1 Sep. 4, 2008

(30) Foreign Application Priority Data

Sep. 25, 2001 (GB) .................................. 0122987.1
Jan. 4, 2002 (GB) .................................. 0200180.8

(51) Int. Cl.
*B63H 11/10* (2006.01)
(52) U.S. Cl. ..................... 60/770; 244/73 R; 244/53 R; 239/265.19
(58) Field of Classification Search ............... 244/53 R, 244/55, 62, 73 R; 60/262, 264, 770; 239/265.13, 239/265.19, 265.33
See application file for complete search history.

(56) References Cited

U.S. PATENT DOCUMENTS

| | | | |
|---|---|---|---|
| 3,565,208 A * | 2/1971 | Millman et al. ............. 181/216 |
| 3,976,160 A | 8/1976 | Hoch et al. |
| 4,121,860 A | 10/1978 | Hoffman |
| 4,383,407 A * | 5/1983 | Inman ......................... 60/771 |
| 4,426,038 A | 1/1984 | Inman et al. |
| 4,525,999 A * | 7/1985 | Inman ......................... 60/407 |
| 4,638,946 A | 1/1987 | Hall |
| 4,872,612 A | 10/1989 | Singer |
| 5,031,836 A | 7/1991 | Ward |
| 5,402,964 A | 4/1995 | Wygnanski |
| 6,253,540 B1 * | 7/2001 | Chew et al. .................... 60/262 |

FOREIGN PATENT DOCUMENTS

| | | |
|---|---|---|
| DE | 31 47 475 | 7/1983 |
| DE | 44 33 462 | 12/1995 |
| FR | 1436411 | 3/1966 |
| FR | 1436412 | 3/1966 |
| GB | 865540 | 4/1961 |
| GB | 871 403 A | 6/1961 |
| GB | 871403 | 6/1961 |
| GB | 871403 A | 6/1961 |
| GB | 878 191 A | 9/1961 |
| GB | 878191 | 9/1961 |
| GB | 878191 A | 9/1961 |
| GB | 2 114 229 | 8/1983 |
| GB | 2 119 023 | 11/1983 |
| GB | 2 119 023 A | 11/1983 |
| GB | 2119023 A | 11/1983 |
| WO | WO 84/00807 | 3/1984 |
| WO | WO 84/00807 A | 3/1984 |
| WO | WO 8400807 A | 3/1984 |

OTHER PUBLICATIONS

Swedish Official Action dated Oct. 24, 2003 for Swedish Application No. 020835-5 and English translation.
German Official Action dated Jun. 2, 2005 for German Application No. 102 42 393.8-15 and English translation.

* cited by examiner

*Primary Examiner*—Timothy D Collins
(74) *Attorney, Agent, or Firm*—Nixon & Vanderhye P.C.

(57) ABSTRACT

A shroud for an aircraft engine exhaust plume, the shroud being formed of a flexible material secured at one end to the exhaust nozzle and selectively extendable downstream with the exhaust plume so as to surround and shroud it, thereby to reduce infrared/radar/noise emissions from the aircraft engine.

21 Claims, 6 Drawing Sheets

AIRCRAFT ENGINE EXHAUST SHROUD

This invention relates to aircraft engine exhaust shrouds, in particular to shrouds for the exhaust plume emitted from the outlet nozzle of an aircraft jet engine.

The typical aircraft engine exhaust plume is both a major contributor to the infrared signature of the aircraft and also a major source of noise (shear layers within the initial core region of the exhaust plume being understood to be the origin of a significant amount of the jet noise). Conventional methods for reducing infrared and/or noise emissions include shrouding the exhaust plume, however this is accomplished by using large, generally cylindrical rigid structures, or by configuring the rear of the aircraft so as to shroud the exhaust. Both of these measures are undesirable, because the structures are bulky, complex, difficult to retrofit to existing aircraft, often impose an unacceptable weight penalty and/or an unacceptable penalty on aircraft fuel consumption, such as through aerodynamic drag.

Accordingly the present invention provides a shroud for an aircraft jet engine exhaust plume emitted from an outlet nozzle, the shroud comprising a length of flexible, heat resistant material secured at one end to the outlet nozzle and selectively deployable to extend downstream substantially parallel with the exhaust plume, the deployed shroud extending around at least a substantial part of the circumference of the exhaust plume.

Such an arrangement restricts the angle of view of the engine cavity (via the engine outlet nozzle) and the exhaust plume and hides these from view. Since the shroud material, which preferably reflects and/or to an extent absorbs heat, is at a lower temperature than the engine exhaust, it has the effect of reducing the detectable infrared signature of the aircraft. The arrangement is also lighter in weight and smaller than conventional solid structures, and much easier to retrofit to existing aircraft. Because the shroud is selectively deployable, any drag/performance penalties arising from the deployed shroud need only be incurred when it is absolutely necessary for the shroud to be deployed. The shroud material could also be "loaded" with a radar absorber, to help reduce the aircraft radar cross section and the return signal from the engine; likewise, the material could be acoustically absorbent and/or reflective, by the inclusion of suitable additives or by shape and configuration, and so reduce the noise level produced by the engine exhaust, the shroud acting as a sound baffle. Finally, the shroud can be configured and/or designed to generate turbulence in order to promote mixing of the hot exhaust gases with cooler ambient air, thus advantageously reducing the infrared signature of the exhaust plume.

The shroud, when deployed, may extend around substantially the whole circumference of the exhaust plume, and may advantageously be in the form of a tube of material. Such a tube might be deployed by means of a telescopic or extending mechanism, so that the shroud may be extended when its infrared/radar/noise shielding qualities are required and retracted when these qualities are not (given that the deployed shroud will inevitably add to the aircraft drag and that noise reduction is particularly required when the aircraft is landing, there is a useful synergy in that it is desirable to increase drag when landing so that deploying the shroud will not only reduce landing noise but also assist the landing process).

There might alternatively be a mechanism for deploying the shroud which is actuated by the onset flow of air when the aircraft is in flight to deploy the shroud, the mechanism being adapted to retract the shroud as the onset flow (related to the aircraft airspeed) decreases below a predetermined level. This mechanism might be resiliently actuated, so that as the drag induced by the deployed shroud increases (as the aircraft airspeed increases), it acts to extend the length of the shroud and as the airspeed decreases the shroud is retracted; then, when the aircraft is on the ground, the shroud would normally be fully retracted.

The tubular shroud might be held open and in position by means of open-ended tubes of flexible material mounted on the outer surface of the shroud and adapted to inflate as a result of the onset flow of air therepast when the aircraft is in flight, the inflated open-ended tubes acting to support the deployed shroud when the aircraft is in flight. Alternatively (or additionally) a rigid or semi-rigid ring might be included at the downstream end of the shroud, the ring being adapted to hold the shroud open and in a tubular form when the shroud is deployed.

Alternatively, the shroud may comprise a matrix of inflatable tubes, such as one or more longitudinal "spine(s)" and a plurality of ribs attached thereto, adapted in use to inflate so as to deploy and support the shroud when the aircraft is in flight.

The inflatable matrix may be inflated by the flow of air past the aircraft in flight, or a supply of compressed gas from a gas cylinder or a pyrotechnic device may be provided for this purpose.

Highly pressurised inflatable structures can be extremely rigid once inflated and deployed, which is advantageous in eliminating or at least significantly reducing movement of the deployed shroud. This constraint serves to reduce drag and also reduces the risk of jet- or onset flow-induced damage to the shroud.

The shroud might comprise a plurality of lengthwise strips of material, each strip being secured at one end to the outlet nozzle. Such an arrangement is more flexible in use, is particularly useful when the aircraft is manoeuvring, more easily repaired when a section of the shroud is damaged, and is more easily extended and retracted by an air onset flow mechanism as described above. Preferably the strips are arranged so as to overlap lengthwise to reduce the possibility of the strips parting to permit noise and/or IR emissions. The overlap also prevents the leakage of hot exhaust gases between adjacent strips; the strips may overlap, or there may be concentric offset rings of strips so that for exhaust gases to escape it would be necessary to negotiate a tortuous path therebetween.

The shroud may comprise a flap of material secured at and hanging from one edge extending around at least a lower part of the outlet nozzle, the flap preferably being shaped so as to extend and to shroud or hide at least the lower part (preferably the lowermost half, more preferably the lowermost third) of the circumference of the exhaust plume from an observer on the ground beneath the outlet nozzle.

Preferably the length of the shroud when deployed is near to the length by which the initial core region of the exhaust plume extends away from the exhaust outlet nozzle, or at least approaches the maximum length thereof. This is so as to optimise the "hiding", effect whilst minimising induced drag.

The invention also provides an aircraft having a shroud as described above.

The invention will now be described, by way of example and with reference to the accompanying drawings in which:

FIG. 3a is a cross-section of part of the shroud of FIG. 3;

In the drawings, like numerals are used to denote like elements.

Figure 1:
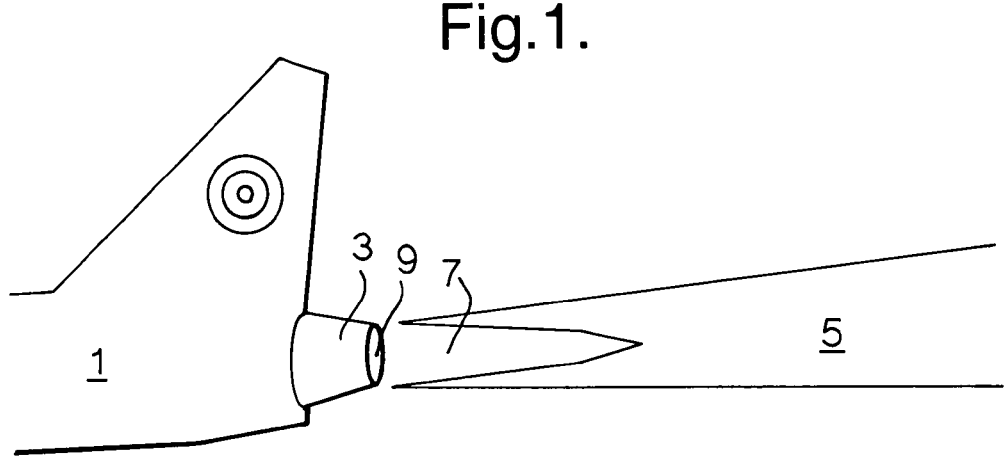
FIG. 1 is a schematic view of the rear end of an aircraft.

FIG. 1 shows the rear part of an aircraft 1 having an engine nozzle 3 from which is emitted a plume 5 of exhaust gases. The exhaust plume 5 has a very hot initial core region 7, and the nozzle 3 has an exit aperture 9.

In flight, a significant contribution to the infra red signature of an aircraft 1 is due to the initial region 7, an observer with a line of sight into the aircraft engine through the nozzle exit aperture 9 will also see the heat generated therein, and therefore the aircraft engine will produce a very strong infra red signal along this line of sight. It is also believed that the initial region 7 is a significant contributor to the noise from the jet engine, which noise is thought to originate from the shear layers within the initial region 7.

Figure 2:
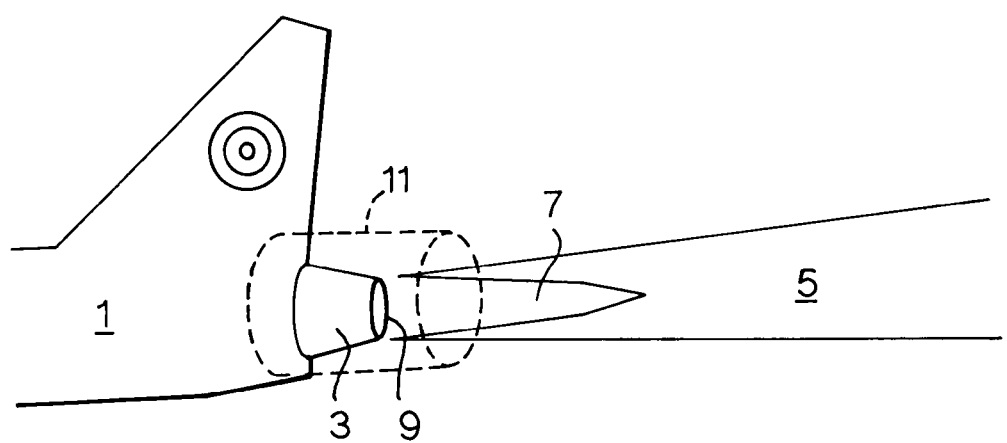
FIG. 2 is a schematic view of the aircraft of FIG. 1 and illustrating the principle of the invention.

FIG. 2 shows the aircraft 1 provided with an open ended cylindrical shroud 11 which is attached at suitable points at the rear of the aircraft and which surrounds the engine nozzle 3 and a significant proportion of the core region 7. The shroud 11 "hides" the nozzle 3 and core region 7 from view and restricts the angles over which these, and the exit aperture 9 can be observed. Because the shroud 11 has a temperature lower than the elements it is hiding from view, it has the effect of reducing the detectable infra red radiation. Further, the shroud shields at least a portion of the core region 7 and, by reflection and/or absorption, reduces the amount of jet noise and infra red emissions. Conventional shrouds are bulky, complicated and heavy structures which are difficult to fit to existing aircraft and, once fitted, cannot be removed in flight or indeed easily.

Figure 3:
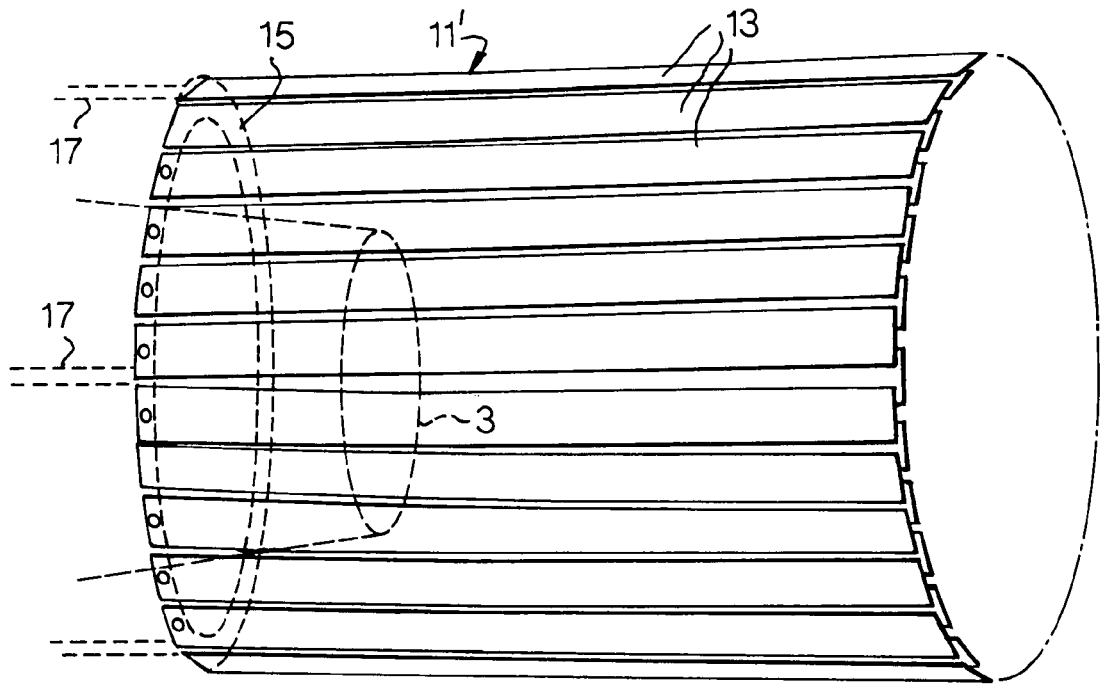
FIG. 3 is a schematic view of a first embodiment of a shroud in accordance with the invention.
Figure 3:
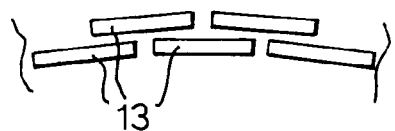

FIG. 3 shows a shroud 11' in accordance with the invention formed of a plurality of strips 13 of fireproof, flexible material, each attached at one end to a ring 15, which is attached directly or by some additional structure 17 to the rear of the aircraft or to the nozzle 3. The strips 13 are disposed in two or more concentric and displaced rings (see FIG. 3a) so that the strips overlap and so that there is no clear path through the shroud 11', for any noise, IR or hot exhaust gas emissions, instead any gas wishing to pass from the exhaust plume through the shroud 11' must follow a convolute path.

Figure 4:
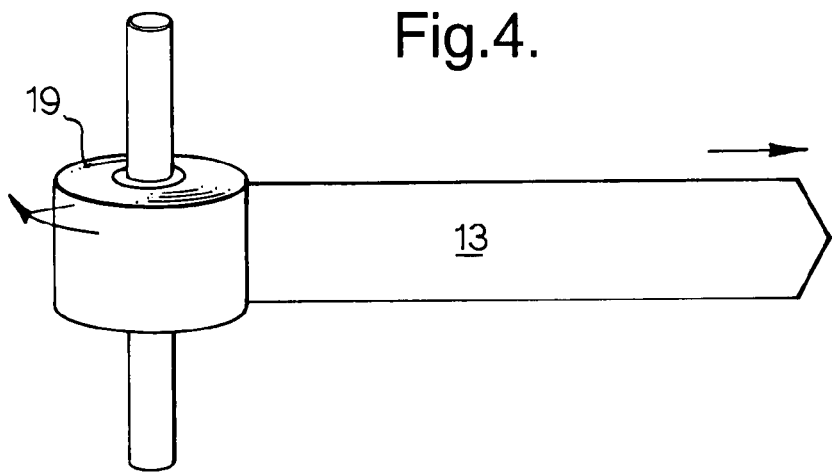
FIG. 4 is a schematic view of part of an automatic deployment mechanism for the shroud of FIG. 3.

The strips 13 shown in FIG. 3 may simply be attached to the aircraft at one end, or they may be retractable as shown in FIG. 4, in which a single strip 13 is wound onto a spring loaded roller 19 which acts to keep the strip 13 coiled up in the absence of any external force. The roller 19 is mounted so that when the aircraft is in forward flight the onset flow of air on the material of the strip 13 causes a frictional drag effect, thus unrolling the strip 13 in the downstream direction as shown by the arrow in FIG. 4. Because the drag caused by the onset flow is proportional to the forward airspeed, the greater the airspeed the longer the length by which the strip unrolls; this is advantageous, as the greater the airspeed the longer the hot region of the exhaust plume which needs to be shielded from observation.

Figure 5A:
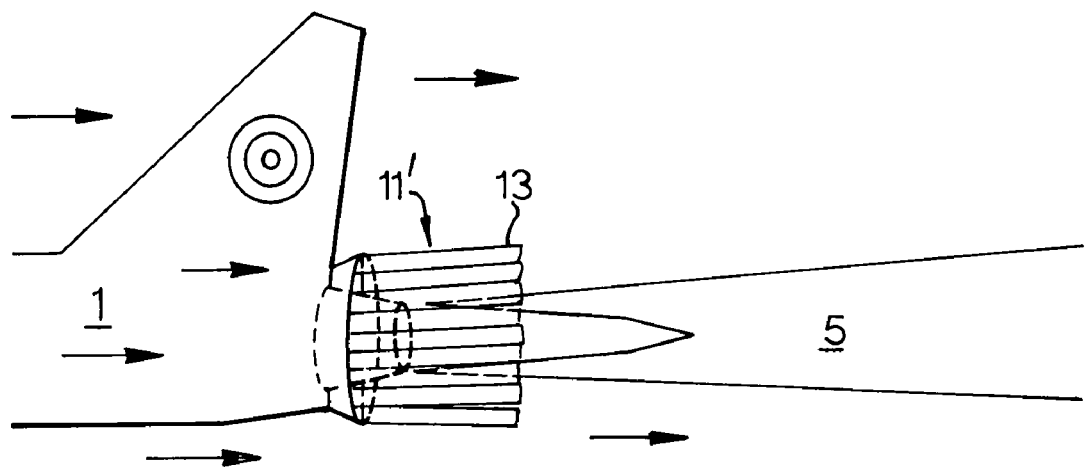
FIGS. 5a and 5b are schematic views of the shroud of FIG. 3 in use on an aircraft in flight and on the ground, respectively.
Figure 5B:
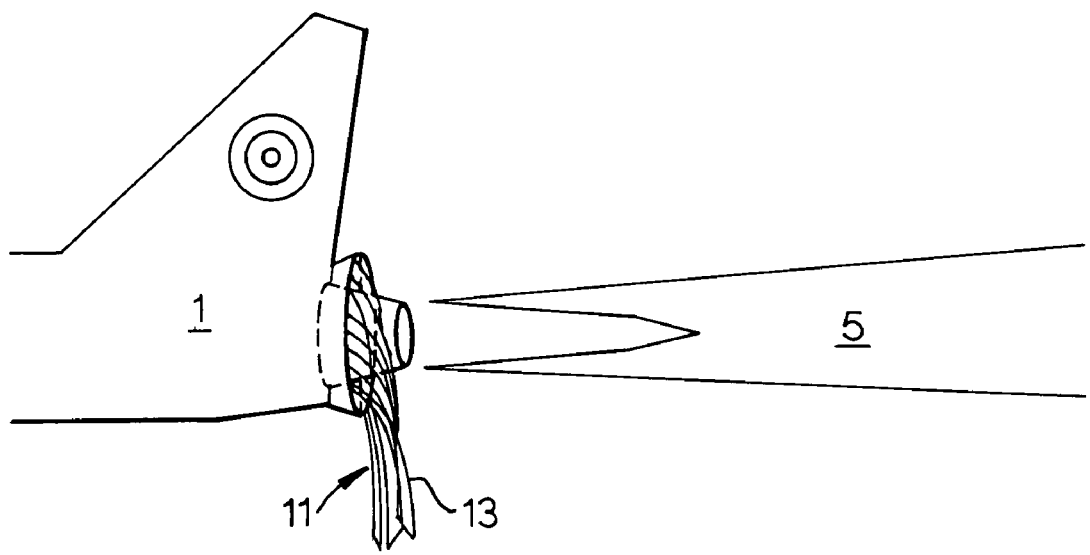

FIGS. 5a and 5b illustrate (when there is no mechanism as in FIG. 4) how the strips 13 of the shroud 11' are extended by the onset flow of air when the aircraft 1 is in forward flight (FIG. 5a), as opposed to when there is no forward airspeed, when the aircraft is on the ground, or hovering (FIG. 5b). In the former case the strips 13 stream out and are extended parallel to the exhaust plume 5, wherein the latter case the strips 13 hang down limply. It will be seen that in the latter cases the strips hanging from the upper part of the shroud tend to hang over the exhaust nozzle, and are prone to damage, hence a retractable shroud is usually preferred.

It should be noted that the shroud 11' may be composed of strips of different, or varying, breadth; there may be a greater number of thin strips of material, a lesser number of broader strips, or a mixture of thick and thin strips around the circumference of the engine nozzle 3. At one extreme, this might produce a single strip in the form of a tube or cylinder of flexible material. With such an arrangement, the material might be damaged by the engine exhaust jet were the aircraft to have no forward airspeed, therefore there would preferably be some form of retraction mechanism—either similar to that of FIG. 4, or as shown in FIGS. 6a and 6b.

Figure 6A:
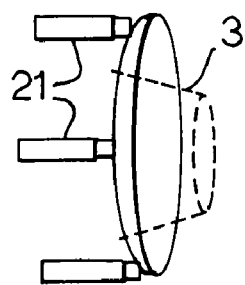
FIGS. 6a and 6b are schematic views of another deployment mechanism for a second embodiment of a shroud in accordance with the invention, showing the shroud retracted and deployed, respectively.
Figure 6B:
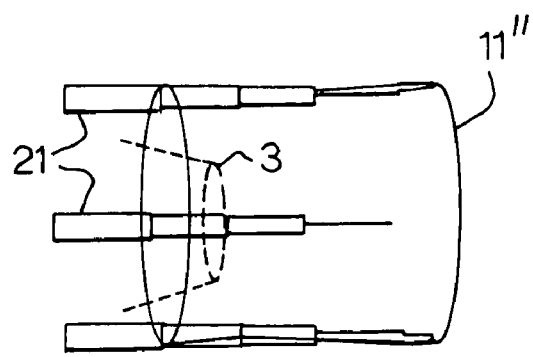
Figure 7:
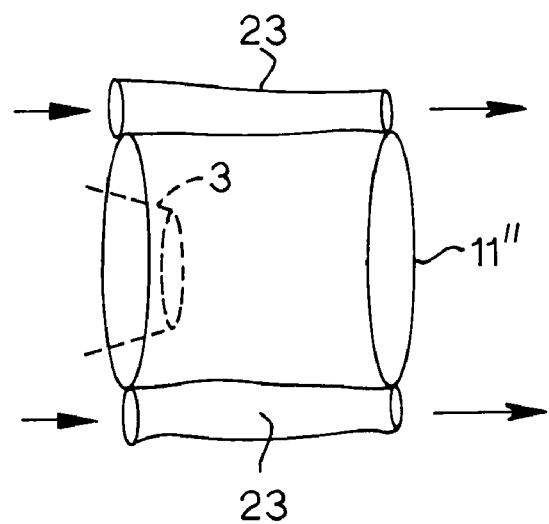
FIG. 7 is a schematic view of another embodiment of a shroud in accordance with the invention.

FIGS. 6a and 6b show a tubular shroud 11" which is folded up (FIG. 6a) before forward flight and extended as in FIG. 6b by a telescoping mechanism 21 when the shroud 11" is required. The telescoping mechanism comprises one or more individual telescopic arms 21 whereby the shroud 11" can be selectively deployed or retracted. Other mechanisms for extending and retracting the shroud will be apparent to those skilled in the art. The tubular shroud 11" is kept open at least partly by the flow of the exhaust plume therethrough, and by the use of a rigid or semi-rigid ring (not shown) integral with or fixed to the downstream end of the shroud 11". Additionally or alternatively, the shroud is held open by the onset flow of ambient air, which may be directed inside the shroud, (to form a boundary layer between the shroud material and the exhaust plume) and/or through open ended tubes inside and/or outside the shroud. For example, as shown in FIG. 7, a number of open ended tubes 23 of some flexible material are provided around the outer circumference of the shroud 11", these being designed to be inflated by the flow of air therethrough and thus hold the shroud 11" semi-rigid, stabilising it and reducing drag and the range of movement of the shroud thus keeping it away from possible damage by the hot exhaust plume. The tubes 23 have a large upstream opening and a smaller downstream opening, which causes the air passing along the tube to become pressurised and thus holding the tubes 23 semi-rigid.

Figure 8:
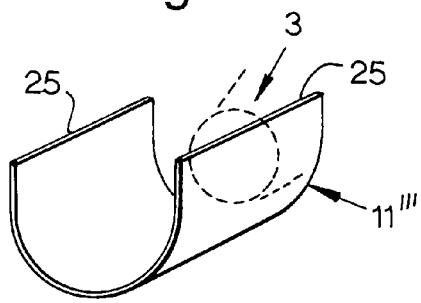
FIG. 8 is a schematic view of a further embodiment of a shroud in accordance with the invention.
Figure 9A:
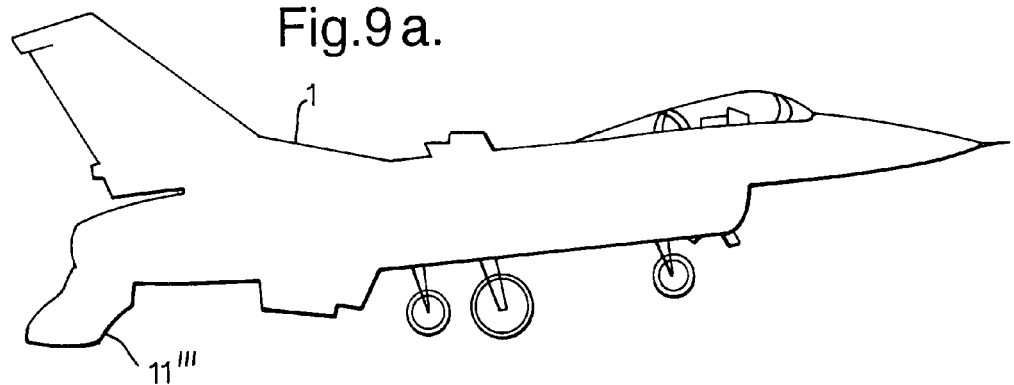
FIGS. 9a and 9b show the shroud of FIG. 8 in use, in the undeployed and deployed modes, respectively.
Figure 9B:
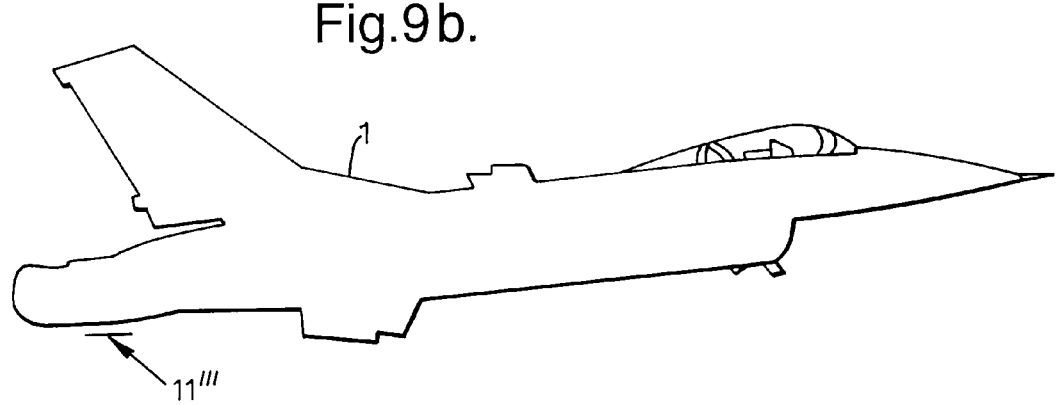

FIG. 8 illustrates another shroud 11''' which comprises a lengthwise part of a cylinder of flexible material which extends only part of the way around the circumference of the engine nozzle 3; this is usually the lowermost part of the circumference of the aircraft when in horizontal flight, in recognition of the likelihood that any observation of the aircraft's infra red and/or noise emissions will be made from below, from the ground. In this case the shroud 11''' is permanently deployed so that in forward flight the onset flow of air keeps the shroud 11''' extended in position (FIG. 9b), whereas the shroud 11''' droops when the aircraft 1 is not in forward flight (as in FIG. 9a); the partial circumference of the shroud 11''' prevents the shroud material from being damaged by the hot exhaust plume when the aircraft is not flying forwards so that the onset air flow extends the shroud 11'''. The shroud is preferably about ½ or ¾ of a cylinder, although certain aircraft exhaust nozzles might be adequately shrouded by a shroud of only ⅓ or ¼ of the total cylinder. Also, the edges 25 of the shroud 11''' may be straight as shown, or they may be flared or curved, according to the degree of shrouding required, and/or the design and/or configuration of the rear of the aircraft 1.

The flexible material of which the shroud is made is fireproof and absorbs and/or reflects thermal radiation. It is preferably also absorbs acoustic energy and it may be shaped and/or configured so as more effectively to shroud the noise of the jet engine. The material may include additives which aid the absorption of thermal, radar and/or acoustic emissions, such as foam structures and the like as are known in the art.

Figure 10A:
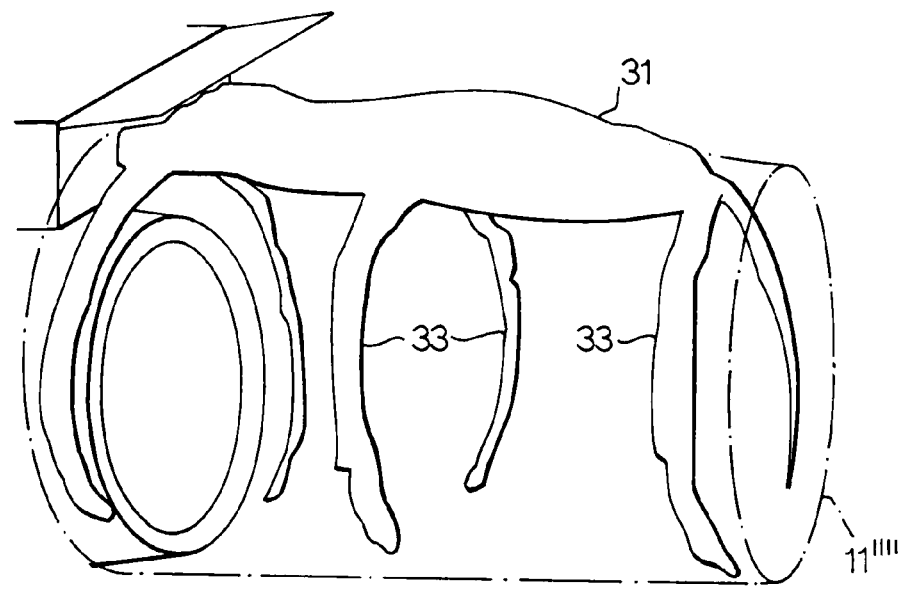
FIGS. 10a and 10b are schematic views of a further embodiment of a shroud in accordance with the invention, in partially and fully deployed states, respectively.
Figure 10B:
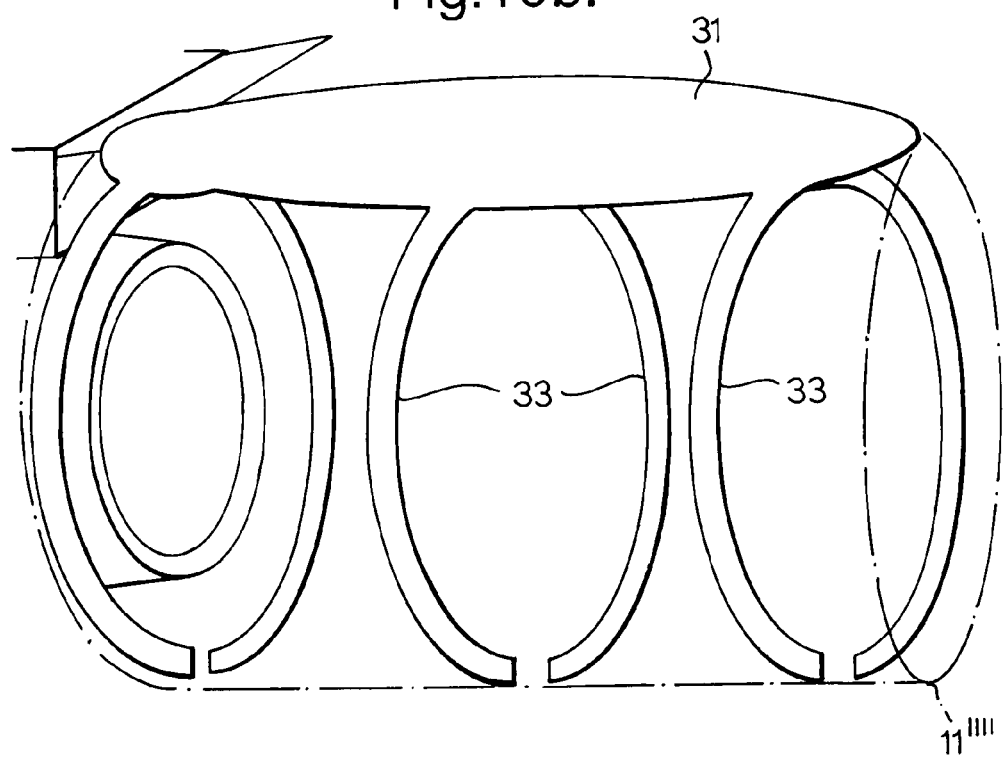

Other modifications will be apparent to those skilled in the art. For example, the shroud may be held open by resilient members, such as semi-rigid members or inflatable tubes. A matrix of inflatable tubes may be provided to deploy the shroud and hold it open. The inflatable tubes may be in the form of one or more longitudinal "spines (s)" 31 with a number of "ribs" 33 attended thereto, as shown in FIGS. 10a and 10b. The inflatable support matrix may be inflated to deploy the shroud 11'''' by diverting the airflow past the aircraft, as described above, or a supply of compressed gas may be provided to inflate the matrix. The compressed gas may be supplied from a cylinder, or from a pyrotechnic device as is known in the art of rapidly inflatable structures. Alternatively, the matrix may be inflated by a "settable" foam, of the kind comprising a liquid containing entrapped gas bubbles, which liquid "sets" into the solid stance over or relatively short period of time—which might be effect by heat coring, for example. The set foam structure would be rigid, and would act as a thermal absorber with respect to the heat from the jet plume; it could also be loaded with radar absorbing particles, hence improving the shielding of the aircraft engine.

A number of rigid or semi-rigid rods may be located inside the shroud, between the shroud and the exhaust plume, to prevent the shroud from collapsing inwards and interacting with the jet, or a resilient helical member may be provided for this purpose, and/or to deploy the shroud. Alternatively, there may be a single annular inflatable sleeve surrounding or inside the shroud to deploy and support the shroud. In another embodiment a rail structure may be provided which circles the outlet nozzle with the shroud being held in an adjacent compartment and arranged to deploy by being released from the compartment to run round the rail, like a curtain on a curtain rail. Alternatively the shroud could be contained in an annular compartment surrounding the outlet nozzle, or slightly upstream, with a release mechanism whereby the shroud is deployed. Advantageously the release mechanism can be arranged both to hold one end of the shroud around the outlet nozzle and also to allow onset air to flow between the secured end of the shroud and the airframe/outlet nozzle, so as to inflate the shroud and hold it open. The release mechanism is selectively operable, in the same way as an arrestor chute, for example, so that the shroud can be deployed when it is required. A further mechanism may be provided for jettisoning the shroud, instead of retracting it.

The invention claimed is:

1. A shroud for an aircraft jet engine exhaust plume emitted from an aircraft outlet nozzle, the shroud comprising:
   a length of substantially flexible, heat resistant material secured at one end to the aircraft; and
   a deployment mechanism for selectively deploying said length of flexible, heat resistant material to extend downstream substantially parallel with the exhaust plume, the deployed shroud extending around a portion of the circumference of the exhaust plume.

2. A shroud as claimed in claim 1 wherein the material is acoustically reflective or absorbent.

3. A shroud as claimed in claim 1 wherein the shroud extends around substantially the whole circumference of the exhaust plume.

4. A shroud as claimed in claim 3 wherein the shroud is in the form of a tube of material.

5. A shroud as claimed in claim 4, wherein said deployment mechanism is adapted to retract the shroud as the onset flow decreases below a predetermined level.

6. A shroud as claimed in claim 4 comprising a rigid or semi-rigid ring at the downstream end of the shroud, and adapted to hold the shroud open and in a tubular form when the shroud is deployed.

7. A shroud as claimed in claim 1 wherein the shroud comprises one or more inflatable elements adapted to inflate to deploy the shroud, and to support the deployed shroud when the aircraft is in flight.

8. A shroud as claim in claim 7, wherein a supply of compressed gas is provided to inflate the elements.

9. A shroud as claimed in claim 7, wherein the inflatable elements are open-ended tubes of flexible material mounted on the outer surface of the shroud and adapted to inflate as a result of the onset flow of air therepast when the aircraft is in flight.

10. A shroud as claimed in claim 9 comprising a deployment mechanism actuated by the onset flow of air when the aircraft is in flight to deploy the shroud alongside the exhaust plume, the mechanism being adapted to retract the shroud as the onset flow decreases.

11. A shroud as claimed in claim 1 comprising a matrix of inflatable tubes adapted in use to inflate so as to deploy and support the shroud when the aircraft is in flight.

12. A shroud as claimed in claim 11 wherein the matrix comprises one or more inflatable longitudinal spine(s) and a plurality of inflatable ribs attached thereto.

13. A shroud as claimed in claim 1 wherein the shroud comprises a plurality of lengthwise strips of material, each strip being secured at one end to the outlet nozzle.

14. A shroud as claimed in claim 1 comprising a single flap of material secured at one edge around at least a lower part of the outlet nozzle, the flap being shaped so as to extend and to shroud at least the lower part of the circumference of the exhaust plume from a ground-base observer.

15. A shroud as claimed in claim 1 wherein the length of the shroud when deployed at least approaches the maximum length by which the initial core region of the exhaust plume extends from the outlet nozzle.

16. A shroud as claimed in claim 1 wherein the material is reflective or absorbent of intra-red radiation.

17. A shroud as claimed in claim 1 wherein the material is absorbent of radar radiation.

18. An aircraft provided with a shroud as claimed in claim 1.

19. An aircraft having a shroud for an exhaust plume emitted from an engine of the aircraft, the shroud comprising a length of heat resistant material secured at one end to the aircraft, the material being flexible so as not to be self-supporting, and in flight being maintained by onset airflow in a deployed state in which it extends downstream of the aircraft, the deployed shroud extending around at least a substantial part of the circumference and length of the exhaust plume.

20. An aircraft as claimed in claim 19 wherein the shroud comprises a plurality of lengthwise strips of material.

21. An aircraft as claimed in claim 20 wherein lengthwise edges of the strips overlap each other.

* * * * *